United States Patent [19]

Schiller et al.

[11] Patent Number: 4,460,761
[45] Date of Patent: Jul. 17, 1984

[54] ORGANOPOLYSILOXANE COMPOSITIONS WHICH ARE STABLE UNDER ANHYDROUS CONDITIONS AND ELASTOMERS FORMED THEREFROM

[75] Inventors: August Schiller, Neuötting; Norman Dorsch, Burghausen, both of Fed. Rep. of Germany

[73] Assignee: Wacker-Chemie GmbH, Munich, Fed. Rep. of Germany

[21] Appl. No.: 466,255

[22] Filed: Feb. 14, 1983

[30] Foreign Application Priority Data

Mar. 31, 1982 [DE] Fed. Rep. of Germany ....... 3212008

[51] Int. Cl.$^3$ ............................................. C08G 77/06
[52] U.S. Cl. ..................................... 528/18; 528/33; 528/34
[58] Field of Search ............................ 528/18, 34, 33

[56] References Cited

U.S. PATENT DOCUMENTS

| 3,186,963 | 1/1965 | Lewis et al. | 528/34 |
| 3,607,801 | 9/1971 | Fulton | 528/34 |
| 3,678,003 | 7/1972 | Kaiser et al. | 528/34 |
| 3,862,919 | 1/1975 | Nitzche et al. | 528/18 |
| 3,957,704 | 5/1976 | Smith et al. | 528/34 |
| 4,102,860 | 7/1978 | Wohlfarth et al. | 528/34 |
| 4,137,249 | 1/1979 | Wohlfarth et al. | 528/34 |
| 4,191,817 | 3/1980 | Schiller et al. | 528/34 |

*Primary Examiner*—Melvyn I. Marquis

[57] ABSTRACT

Compositions which are stable when stored under anhydrous conditions, but which crosslink to form elastomers when exposed to moisture at room temperature are prepared by mixing (1) a diorganopolysiloxane having terminal condensable groups, with (2) a silicon compound containing at least three groups per molecule selected from amino groups which are bonded to silicon via nitrogen, oxime groups which are bonded to silicon via oxygen or mixtures thereof and (3) a product which is obtained from the reaction of (a) a silane containing as hydrolyzable groups at least two monovalent hydrocarbon radicals per molecule which are bonded to silicon via oxygen in which the monovalent hydrocarbon radicals may be interrupted by at least one ether-oxygen, or an oligomer thereof, with (b) a diorganotin diacylate, in which all the valences of the tin atom in the reaction product are saturated by SnC-bonded monovalent radicals or by oxygen atoms of the ≡SiOSn≡ group.

13 Claims, No Drawings

ORGANOPOLYSILOXANE COMPOSITIONS WHICH ARE STABLE UNDER ANHYDROUS CONDITIONS AND ELASTOMERS FORMED THEREFROM

The present invention relates to storage stable organopolysiloxane compositions, particularly to organopolysiloxane compositions which are stable under anhydrous conditions, but when exposed to moisture at room temperature crosslink to form elastomers and to a process for preparing the same.

BACKGROUND OF THE INVENTION

Compositions which may be stored under anhydrous conditions, but when exposed to moisture at room temperature, crosslink to form elastomers are known in the art. For example, U.S. Pat. No. 4,102,860 to Wohlfarth et al describes compositions which may be stored under anhydrous conditions, but when exposed to moisture at room temperature, crosslink to form elastomers. These compositions contain a diorganopolysiloxane having terminal condensable groups, a silicon compound having at least three hydrolyzable groups per molecule, in which the hydrolyzable groups may consist of amino groups which are bonded to silicon via nitrogen, or oxime groups which are bonded to silicon via oxygen, and the reaction product of, for example, a di-n-butyltin diacetate with, for example, tetraethylsilicate. The reaction products obtained from an alkoxysilane and a tin compound in accordance with the cited patent are crystalline at room temperature and have at least one acylate group bonded to the tin atom. These crystalline compounds are difficult to mix with the organopolysiloxane composition to form a homogeneous, uniform cross-linkable composition. Often times it is necessary to employ a solvent for the condensation catalyst in order to form a uniform mixture; However, the presence of a solvent often results in shrinkage of the resultant elastomers.

In contrast to the condensation catalysts obtained from the reaction of an alkoxysilane and a dialkyltin salt such as described by Wohlfarth, the condensation catalysts of the present invention are liquid at room temperature. These catalysts are easily combined with the constituents of the organopolysiloxane composition to form a homogeneous mixture without requiring the use of a solvent. Also, the elastomers of the present invention can be stretched as soon as cross-linking begins, without such stretching resulting in tears or fissures in the freshly formed skin or in that portion below the skin which has not yet begun to cross-link. Moreover, the resultant elastomers exhibit good adhesion to the substrates on which they are formed and are very stable when exposed to water, including atmospheric moisture or rain, heat or ultraviolet or infrared rays, including solar radiation.

Therefore, it is an object of the present invention to provide organopolysiloxane compositions which are stable under anhydrous conditions, but when exposed to moisture at room temperature, cross-link to form elastomers. Another object of the present invention is to provide a silicon-tin condensation catalyst which is liquid at room temperature. Still another object of the present invention is to provide a silicon-tin compound which is miscible with the constituents of the organopolysiloxane composition. Still another object of the present invention is to provide a silicon-tin compound which may be combined with an organopolysiloxane composition in the absence of a solvent. A further object of the present invention is to provide elastomers which may be stretched as soon as cross-linking begins without such stretching resulting in tears and fissures in the freshly formed skin. A still further object of the present invention is to provide elastomers which exhibit good adhesion to substrates and are very stable to water, atmospheric moisture and ultraviolet rays.

SUMMARY OF THE INVENTION

The foregoing objects and others which will become apparent from the following description are accomplished in accordance with this invention, generally speaking, by providing compositions which are stable when stored under anhydrous conditions, but when exposed to moisture at room temperature, cross-link to form elastomers comprising (1) a diorganopolysiloxane having terminal condensable groups, (2) a silicon compound containing at least three amino groups per molecule which are bonded to silicon via nitrogen or oxime groups which are bonded to silicon via oxygen or a mixture of at least three amino groups and oxime groups per molecule, and (3) a product which is obtained from the reaction of (a) a silane containing as hydrolyzable groups at least two monovalent hydrocarbon radicals per molecule which are bonded to silicon via oxygen and which may optionally be interrupted by at least one ether-oxygen, or an oligomer thereof, and (b) a diorganotin diacylate, in which all the valences of the tin atom of the reaction product (3) are saturated by SnC-bonded monovalent radicals or by oxygen atoms of the ≡SiOSn≡ group.

These compositions are prepared by mixing the diorganopolysiloxane (1) having terminal condensable groups with the silicon compound (2) containing at least three amino groups and/or oxime groups per molecule and the product (3) obtained from the reaction of a silane containing at least two monovalent hydrocarbon radicals per molecule which are bonded to silicon via oxygen and which may optionally be interrupted by an ether-oxygen or an oligomer thereof with a diorganotin diacylate in which all the valences of the tin atom of the reaction product (3) are saturated by SnC-bonded monovalent radicals or by oxygen atoms of the ≡SiOSn≡ group.

When the resultant composition is exposed to moisture at room temperature, it cross-links to form an elastomer.

DETAILED DESCRIPTION OF THE INVENTION

The diorganopolysiloxanes having terminal condensable groups which are used in the preparation of the compositions of this invention may be the same diorganopolysiloxanes having terminal condensable groups which have been or could have been used heretofore in the preparation of compositions which are stable under anhydrous conditions, but which cross-link to form elastomers when exposed to moisture at room temperature, containing a diorganopolysiloxane having terminal condensable groups, a silicon compound having at least three amino groups which are bonded to silicon via nitrogen, or oxime groups which are bonded to silicon via oxygen, or a total of at least three amino groups and oxime groups per molecule and at least one additional component. The diorganopolysiloxanes having terminal condensable groups which have heretofore been preferred in the preparation of such compositions can be represented by the following formula $$HO(SiR_2O)_mSiR_2OH,$$

in which R represents the same or different monovalent SiC-bonded organic radicals and m is an integer having a value of at least 10.

Although this is generally not shown in such formulas, other siloxane units may be present in addition to the diorganosiloxane units ($SiR_2O$), within or along the siloxane chains of the above formula. Examples of such other siloxane units which are mostly present as impurities, are siloxane units corresponding to the following formulas $$RSiO_{3/2}, R_3SiO_{\frac{1}{2}} \text{ and } SiO_{4/2}$$

where R is the same as above. It is preferred that such siloxane units, other than the diorganosiloxane units be present in an amount not to exceed about five mole percent of all siloxane units present in the diorganopolysiloxanes having terminal condensable groups. If desired, the hydroxyl groups of the above formula may be entirely or partially substituted with other condensable groups, such as alkoxy radicals having from 1 to 4 carbon atoms per radical.

The radicals represented by R may be hydrocarbon radicals having from 1 to 18 carbon atoms per radical. Examples of straight or branched chain alkyl radicals are methyl, ethyl, n-propyl, isopropyl, n-butyl, sec-butyl, 2-ethylhexyl, n-decyl and n-tetradecyl radical as well as the octadecyl radicals; cycloalkyl radicals such as the cyclohexyl radical and methylcyclohexyl radical; straight or branched chain alkenyl radicals, such as the vinyl, allyl and methallyl radical; aryl radicals, such as the phenyl radical; alkaryl radicals, such as the tolyl radicals; and aralkyl radicals, such as the beta-phenylethyl radical.

Examples of straight or branched chain substituted hydrocarbon radicals represented by R are halogenated hydrocarbon radicals. Specific examples of substituted hydrocarbon radicals are the 3,3,3-trifluoropropyl radical, and chlorophenyl and bromophenyl radical; and cyanoalkyl radicals, such as, the beta-cyanoethyl radical. Because of their availability, it is preferred that at least 80 percent of the number of the SiC-bonded organic radicals represented by R in the diorganopolysiloxanes having terminal condensable groups as well as the R radicals shown above in the formulas illustrating the preferred diorganopolysiloxane having terminal condensable groups, are methyl radicals.

The diorganopolysiloxanes having terminal condensable groups may be either homopolymers with the same or different viscosity. In the preparation of the compositions of this invention, only one type of diorganopolysiloxane need be used having terminal condensable groups, or it is possible to use a mixture of two or more different types of diorganopolysiloxanes having terminal condensable groups.

It is preferred that the viscosity of the diorganopolysiloxanes having terminal condensable groups be in the range of from 1500 to 500,000 mPa.s at 25° C.

The silicon compounds having at least three amino groups per molecule which are bonded to silicon via nitrogen, or three oxime groups per molecule which are bonded to silicon via oxygen, or a total of at least three amino groups and oxime groups per molecule, used in the preparation of the compositions of this invention may be the same silicon compounds which have been or could have been used heretofore in the preparation of compositions which are storage-stable under anhydrous conditions but which cross-link and form elastomers when exposed to moisture at room temperature. These compositions are or were prepared from a diorganopolysiloxane having terminal condensable groups and a silicon compound containing at least three amino groups which are bonded to silicon via nitrogen, or three oxime groups bonded to silicon via oxygen, or a mixture of at least three amino groups and oxime groups per molecule and at least one additional constituent.

Examples of silicon compounds which may be used in the preparation of the compositions of this invention having at least three amino groups bonded to silicon via nitrogen per molecule are aminosilanes of the following formula $$R_aSi(NR^1_2)_{4-a},$$

where R is the same as above, $R^1$ represents hydrogen or a monovalent hydrocarbon radical, a is 0 or 1, and partial hydrolysates thereof which may not contain more than 10 silicon atoms per molecule. Except for vinyl radicals, the examples of hydrocarbon radicals represented by R are applicable to the hydrocarbon radicals represented by $R^1$. It is preferred that in each amino group one $R^1$ be hydrogen and that the other $R^1$ represent an n-butyl, sec-butyl or cyclohexyl radical. Specific examples of such silicon compounds are the following:
methyltris-(n-butylamino)-silane
methyltris-(sec-butylamino)-silane and
methyltris-(cyclohexylamino)-silane.

Examples of silicon compounds having at least three oxime groups per molecule which are bonded to silicon via oxygen and which may be employed in the preparation of the compositions of this invention are oximosilanes of the formula $$R_aSi(ON\!\!=\!\!X)_{4-a},$$

where R and a are the same as above, X represents an $R^1_2C$ group, where $R^1$ is the same as above, with the proviso that least one $R^1$ must represent a hydrocarbon radical or X may represent an $R^2C$ group, where $R^2$ represents a divalent hydrocarbon radical which forms a ring together with the carbon atom other than the carbon atom of $R^2$, and partial hydrolysates thereof which contain up to 10 silicon atoms per molecule.

Examples of silicon compounds which contain at least three oxime groups per molecule which are bonded to silicon via oxygen, are the following:
methyltris-(methylethylketoxime)-silane
methyltris-(acetonoxime)-silane and
methyltris-(cyclohexanonoxime)-silane.

Examples of silicon compounds which may be used in preparing the compositions of this invention which contain at least three groups per molecule consisting of amino groups which are bonded to silicon via nitrogen and oxime groups which are bonded to silicon via oxygen, are silanes of the formula $$R_aSi(ON\!\!=\!\!X)_b(NR^1_2)_{4-a-b},$$

where R, $R^1$, X and a are the same as above, b is 0, 1, 2 or 3, with an average of from about 0.1 to 2.9 and the sum of a+b may not exceed 3.9, and partial hydrolysates thereof containing up to 10 silicon atoms per molecule.

An example of a silicon compound which may be used in preparing the compositions of this invention and which has a total of at least three groups per molecule consisting of amino groups which are bonded to silicon via nitrogen and oxime groups bonded to silicon via oxygen per molecule, is methylbis-(methylethylketoxime)-cyclohexylaminosilane. It is, of course, possible to employ mixtures consisting of, for example, methyltris-(cyclohexylamino)-silane and methyltris-(methylethylketoxime)-silane in the preparation of the compositions of this invention.

In preparing the compositions of this invention, it is preferred that the silicon compound containing at least three amino groups per molecule which are bonded to silicon via nitrogen or three oxime groups per molecule which are bonded to silicon via oxygen or a total of at least three groups per molecule consisting of amino groups and oxime groups, be used in such an amount that a total of at least 3 gram equivalents of amino groups that are bonded to silicon via nitrogen and/or oxime groups that are bonded to silicon via oxygen, be present for each gram equivalent of condensable groups in the diorganopolysiloxane. This frequently amounts to from 0.2 to about 15 percent by weight, and more particularly from about 1 to about 8 percent by weight, based on the total weight of all constituents of the composition.

The silanes which are employed in the preparation of the reaction products of this invention and contain at least two monovalent hydrocarbon radicals per molecule which are bonded to silicon via oxygen and which may optionally be interrupted by at least one ether-oxygen, can be represented by the following formula $$R_cSi(OR^3)_{4-c}.$$

In the above formula, R is the same as above, $R^3$ represents the same or different monovalent hydrocarbon radicals which may be interrupted by one or more ether-oxygen atoms, and c is 0, 1 or 2.

The oligomers of such silanes are compounds having at least two and no more than 10 silicon atoms which are bonded together via a siloxane-oxygen and which, on the average, contain at least one $R^3O$ group per silicon atom. Such oligomers can be obtained from the partial hydrolysis of silanes corresponding to the following formula $$R_cSi(OR^3)_{4-c}.$$

The examples cited for the R radicals in the diorganopolysiloxanes having terminal condensable groups, also apply to the R radicals in the silanes of the following formula $$R_cSi(OR^3)_{4-c}.$$

Preferred as the R radicals in the silanes, or as the SiC-bonded organic radicals in the oligomers of the silanes, are hydrocarbon radicals having from 1 to 4 carbon atoms. Specific examples of R radicals are described in connection with the diorganopolysiloxanes having terminal condensable groups. Preferred examples of R radicals are the methyl and vinyl radicals.

Preferred $R^3$ radicals are alkyl radicals having from 1 to 4 carbon atoms, such as the methyl, ethyl, n-propyl, isopropyl, n-butyl and the sec-butyl radical, or a mixture of such radicals.

An example of an $R^3$ radical which contains an ether-oxygen is the methoxyethylene-($CH_3OCH_2CH_2$-) radical.

Examples of silanes or their oligomers which may be reacted with certain tin compounds to prepare the reaction product employed as condensation catalysts in the compositions of this invention are tetraethylsilicate, vinyltriethoxysilane, dimethyldiethoxysilane, hexaethoxydisiloxane and an ethoxypolysiloxane having an $SiO_2$ content of from 30 to 45 percent by weight, such as the commercially available "Ethylsilicate 40".

The reaction products obtained from the reaction of a silane or its oligomer with a tin compound, may be prepared from a single type of silane, or a mixture containing two or more different silicon compounds, such as for example, a mixture containing tetraethylsilicate and hexaethoxydisiloxane.

The diorganotin diacylates can be represented by the following formula $$R^4_2Sn(OCOR^5)_2.$$

In the above formula, $R^4$ represents the same or different monovalent SnC-bonded organic radicals and $R^5$ represents the same or different monovalent hydrocarbon radicals or substituted monovalent hydrocarbon radicals.

It is preferred that the $R^4$ radicals also have from 1 to 18 carbon atoms per radical and the examples previously cited for the R radicals in connection with the diorganopolysiloxanes having terminal condensable groups, also apply to the $R^4$ radicals. Preferred $R^4$ radicals are the methyl, the n-butyl, n-octyl and the 2-ethylhexyl radical. It is preferred that the $R^4$ radicals be the same, i.e., that both $R^4$ radicals be, for example, n-butyl radicals.

The $R^5$ radicals are preferably alkyl radicals having from 1 to 4 carbon atoms and the examples previously cited for the $R^3$ radicals also apply to the $R^5$ radicals. A preferred $R^5$ radical is the methyl radical, because it is easily removed by distilling the esters generated as by-products during the preparation of the products obtained from the reaction of the silicon compound and the tin compound. Furthermore, it is preferred that both $R^5$ radicals be the same, i.e., that both $R^5$ radicals be, for example, methyl radicals.

Specific examples of diorganotin diacylates which are preferred for the preparation of the reaction products from a tin compound and silane or its oligomer, are di-n-butyltin diacetate and di-2-ethylhexyltin diacetate.

The reaction products obtained from the reaction of a silicon compound with a tin compound may be prepared from only one type of diorganotin diacylate or a mixture of two or more different tin compounds of this type.

It is essential that all the valences of the tin atoms in the product obtained from the reaction of a diorganotin diacylate and a silane having at least two monovalent hydrocarbon radicals per molecule which are bonded to silicon via oxygen, or an oligomer thereof, be saturated by SnC-bonded monovalent radicals, or by oxygen atoms of the $\equiv SiOSn\equiv$ group.

Thus, in preparing the reaction products of this invention, it is essential that at least 1 gram equivalent of an $-OR^3$ group be used for each gram equivalent of $R^5OCO$ group. It is preferred that from 4 to 25 gram equivalents of an $R^3O$ group be used for each mole of diorganotin diacylate.

It is preferred that the mixture containing the silane having as hydrolyzable groups at least two monovalent hydrocarbon radicals per molecule which are bonded to silicon via oxygen and which may be interrupted by at least one ether-oxygen, or its oligomer, and a diorganotin diacylate, be heated at temperatures ranging from about 15° to about 200° C. for from 15 minutes to about 15 hours. The heating step is preferably performed at atmospheric pressure, i.e., at approximately 1 bar, or at reduced pressure. The preparation of such reaction products is described in U.S. Pat. No. 3,186,963 to Lewis et al; however, the reaction products described in this patent are employed as condensation catalysts in, for example, "two-component" systems.

The esters generated as by-products as a result of the reaction of the silicon compound and the diorganotin diacylate are preferably removed by distillation, in order to reduce the shrinkage of the resultant elastomers formed from the compositions.

The products obtained from the reaction of a silane and a diorganotin diacylate can be represented by the following formula

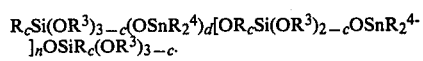

in which R, $R^3$, $R^4$ and c are the same as above, d is 0 or 1, and n is 0 or at least 1.

It is preferred that the product obtained from the reaction of a diorganotin diacylate and a silane having as hydrolyzable groups at least two monovalent hydrocarbon radicals per molecule which are bonded to silicon via oxygen, or which are interrupted by at least one ether-oxygen, or an oligomer thereof, be present in the compositions of this invention in an amount of from 0.01 to 5 percent by weight and more preferably in an amount of from 0.1 to 1 percent by weight, based on the total weight of all the constituents of the composition.

In addition to the essential constituents, namely (1) a diorganopolysiloxane having terminal condensable groups, (2) a silicon compound having at least three amino groups which are bonded to silicon via nitrogen, or oxime groups which are bonded to silicon via oxygen or at least three groups per molecule consisting of amino groups and oxime groups, and (3) the product of the reaction of a silane having at least two monovalent hydrocarbon radicals per molecule which are bonded to silicon via oxygen, which may optionally be interrupted by at least one ether-oxygen, or its oligomer, with a diorganotin diacylate, the compositions of this invention may also contain other substances. It is in fact preferred that in addition to the aforementioned substances, the compositions of this invention also contain agents which serve to enhance the adhesion of elastomers prepared from the compositions of this invention on substrates on which the elastomers are formed. Among such agents are organosilanes having at least one amino group which is bonded to silicon via carbon, such as described in U.S. Pat. No. 3,678 003 to Kaiser et al, and organosiloxanes having at least one amino group which is bonded to silicon via carbon, such as described in U.S. Pat. No. 4,191,817 to Schiller et al.

Additional examples of substances which may be incoporated in the compositions of this invention are reinforcing inorganic fillers which may be hydrophilic or hydrophobic, nonreinforcing inorganic fillers which may also be hydrophilic or hydrophobic; pigments, soluble dyes, fragrances, emollients, for example, dimethylpolysiloxanes which have trimethylsiloxy terminal groups and which are liquid at room temperature, or phosphoric acid esters, fungicides, resinous organopolysiloxanes, including those consisting of $(CH_3)_3SiO_{\frac{1}{2}}$ and $SiO_{4/2}$ units, organic resins such as homopolymers or copolymers of acrylonitrile, polystyrene, polyvinylchloride or polypropylene, organic resins which have been obtained from the polymerization of, for example, monomers of styrene and n-butylacrylate in the presence of diorganopolysiloxanes having terminal condensable groups by means of free radicals. Also, the compositions of this invention may contain corrosion-inhibitors, polyglycols which may be esterified or etherified, oxidation inhibitors, heat-stabilizers, solvents, agents which serve to influence the electrical properties of the compositions of this invention such as conductive carbon, flame-retardant agents, photo-protective agents and substrates which retard cross-linking such as silanes having an SiC-bonded mercaptoalkyl radical.

The compositions of this invention may be prepared by mixing the components in any desired sequence. Mixing is preferably performed at room temperature under anhydrous conditions. If desired, the mixing process may, however, also take place at temperatures higher than room temperature, for example, at temperatures between 35° and 135° C.

The moisture present in the atmosphere is generally sufficient to bring about the cross-linking of the compositions. However, if desired, cross-linking may be performed at temperatures which are below room temperature, for example, at temperatures between −5 and +10° C. Also, cross-linking may be performed in the presence of moisture which exceeds that normally present in atmospheric moisture.

The compositions of this invention may be used as sealants for fissures, including vertical fissures and similar cavities having widths of from 10 to 40 mm, for example, fissures and cavities in buildings, land, water and air transportation vehicles, or as adhesives and putties in manufacturing windows, aquariums and showcases. The compositions may be used as coatings including those exposed to fresh or salt water, or as coatings which are intended to prevent sliding, or for any other applications in which compositions which cross-link and form elastomers at room temperature could heretofore be used, including the insulation of electrical or electronic devices or the preparation of rubber-elastic molds.

In the following examples all parts and percentages are by weight unless otherwise specified.

The products obtained from the reaction of tetraalkoxysilane and diorganotin diacylate which are used in the following examples as condensation catalysts are prepared in the following manner:

(a) A mixture consisting of 4 parts of tetra-n-propoxysilane and 1 part di-n-butyltin diacetate is heated under constant agitation to 120° C. for 6 hours at atmospheric pressure. The acetic acid propylester formed is simultaneously distilled off.

The IR-spectrum indicates the disappearance of the stretching vibration of the carboxyl group of the di-n-butyltin diacetate which is in the range of 1600 cm$^{-1}$.

(b) The process described in (a) above is repeated except that 2 parts of tetraethylsilicate are used instead of the 4 parts of tetra-n-propylsilicate. Acetic acid ethylester is distilled off instead of acetic acid propylester.

(c) The process described in (b) above is repeated, except that 4 parts of ethoxypolysiloxane having an $SiO_2$ content of about 34 percent are substituted for the 2 parts of tetraethylsilicate.

The organopolysiloxane containing amino groups, which are bonded to silicon via carbon, used in some of the examples consists according to the NMR spectrum, of 16.4 mole percent of $CH_3O$ groups, 71 mole percent of dimethylsiloxane units and 12.6 mole percent of a group of the following formula:

$H_2N(CH_2)_2NH(CH_2)_3SiO$.

The organopolysiloxane is prepared by reacting a silane of the following formula

$H_2N(CH_2)_2NH(CH_2)_3Si(OCH_3)_3$ with a dimethylpolysiloxane having a viscosity of 80 mPa.s at 25° C. and having an Si-bonded hydroxyl group in each of its terminal units.

EXAMPLE 1

About 40 parts of a dimethylpolysiloxane containing an Si-bonded hydroxyl group in each of its terminal units and having a viscosity of 300,000 mPa.s at 25° C., are mixed in the following sequence with 20 parts of a dimethylpolysiloxane having an Si-bonded hydroxyl group in each of its terminal units and having a viscosity of 20,000 mPa.s at 25° C., and 40 parts of a trimethylsiloxy end-blocked dimethylpolysiloxane having a viscosity of 100 mPa.s at 25° C., and 2 parts of tri-n-butyl-phenol polyethylene glycol ether having 13 ethylene oxide units and 1 part of the above described organopolysiloxane which contains amino groups that are bonded to silicon via carbon. About 10 parts of methyl-tris-(methylethylketoxime)-silane are then added to the mixture. The mixture thus obtained is then mixed with 80 parts of calcium carbonate whose surface is coated with stearic acid ("coated chalk"), 10 parts of pyrogenically prepared fumed silica having a surface area of 150 m²/g, and 2 parts of the reaction product whose preparation is described in (a) above.

The composition which is freed of air bubbles by evacuation, is storage-stable under anhydrous conditions and cross-links to form an elastomer when exposed to moisture at room temperature. It is homogeneous, smooth, soft and slump-proof at a temperature range of from 5° C. to 70° C., i.e., it does not flow from a vertical fissure before cross-linking within this temperature range.

In order to determine if the composition forms an elastomer which can be stretched as soon as cross-linking begins without tearing the skin or the uncross-linked portion of the composition located under the initially formed skin, the following test is performed. After it has been stored in a sealed container for three months at room temperature, a sample of the composition is placed between two vertical and parallel aluminum plates measuring 100×10 mm which are standing on a polyethylene foil with a distance of 11 mm between the plates. The distance between the plates is then increased to 12.6 mm, i.e., by 14.6 percent, over a period of 5 hours beginning immediately after the sample has been placed in the interstice between the aluminum plates, and also after the test plates with the filled-in fissures has first been stored in a circulating air dryer for 2 hours at 50° C. No tears, or any other cavities are formed on the surface or in the interior of the filled-in area between the aluminum plates.

EXAMPLE 2

The process described in Example 1 is repeated, except that 1 part of the reaction product whose preparation is described under (b) above, is substituted for the 2 parts of the reaction product whose preparation is described under (a) above.

The composition is tested for its stretchability in accordance with the procedure described in Example 1. The results are identical with those obtained in Example 1.

COMPARISON EXAMPLE $V_1$

The procedure described in Example 1 is repeated, except that the tin compound is omitted.

When the composition is tested as to its stretchability, both immediately after the interstices between the plates have been filled, and after the filled-in plates have been stored for 2 hours at 50° C. in a drying chamber, several tears appear on the surface of the filled in area between the plates.

EXAMPLE 3

About 55 parts of a dimethylpolysiloxane having an Si-bonded hydroxyl group in each of its terminal units and having a viscosity of 80,000 mPa.s at 25° C., are mixed in the following sequence with 35 parts of a trimethylsiloxy end-blocked dimethylpolysiloxane having a viscosity of 100 mPa.s at 25° C., 6 parts of a mixture consisting of equal parts of methyltris-(methylethylketoxime)-silane and methyltris-(cyclohexylamino)-silane, and 2 parts of the organopolysiloxane described immediately before Example (1) which has amino groups that are bonded to silicon via carbon, and 11 parts of a pyrogenically prepared silicon dioxide having a surface area of 150 m²/g. About 0.3 parts of the reaction product prepared in accordance with the procedure described in paragraph (c) above, are then incorporated in the mixture.

The resultant composition is then tested after it has been stored in a sealed container at room temperature for three months. The test is performed in accordance with the procedure described in Example 1. Stretching of the mass which filled the space between the two aluminum plates, both immediately after the cavity has been filled, as well as after storage for 2 hours in a drying chamber, did not result in the formation of tears or other cavities either on the surface or in the interior of the filled-in area between the aluminum plates.

COMPARISON EXAMPLE $V_2$

The process described in Example 3 is repeated, except that the tin compound is omitted.

When the composition is tested by stretching, both immediately after the space between the aluminum plates has been filled, as well as after storage for 2 hours at 50° C. in the drying chamber, several tears are observed on the surface of the filled-in area between the plates.

EXAMPLE 4

About 20 parts of the dimethylpolysiloxane containing an Si-bonded hydroxyl group in each of its terminal units and having a viscosity of 300,000 mPa.s at 25° C., are mixed in the following sequence with about 7 parts of a dimethylpolysiloxane having an Si-bonded hydroxyl group in each of its terminal units and having a viscosity of 20,000 mPa.s at 25° C., 20 parts of a trimethylsiloxy end-blocked dimethylpolysiloxane having a viscosity of 1,000 mPa.s at 25° C., 2 parts of tri-n-butylphenol polyethylene glycol ether containing 13 ethylene oxide units, 0.6 parts of a silane having the formula $$H_2N(CH_2)_2NH(CH_2)_3Si(OCH_3)_3$$

and 7 parts of a mixture consisting of 3 parts of methyltris-(methylethylketoxime)-silane, 2 parts methyltris-(cyclohexylamino)-silane and 1 part dimethylbis(cyclohexylamino)-silane. To this mixture are added, in the following sequence, about 45 parts of calcium carbonate whose surface is coated with stearic acid, 4 parts of pyrogenically prepared silicon dioxide having a surface area of 150 m²/g, and 0.33 parts of the reaction product whose preparation is described under (a) above.

The resultant composition which is freed of air bubbles by evacuation, is storage-stable under anhydrous conditions and cross-links to form an elastomer when exposed to moisture at room temperature. It is smooth, soft and slump-proof. It is placed in tubes and stored at room temperature for 24 hours. Samples are then taken from the tubes and applied on the surface of the substrates indicated in Table 1 and allowed to cross-link during one week's storage at a temperature of 23° C. and at 50 percent relative humidity. The adhesion of the elastomer to the following substrates is then tested by their mechanical removal from the respective substrates.

The results are shown in Table I.

TABLE I

| Substrate | Adhesion |
|---|---|
| Aluminum | + |
| Anodized aluminum | + |
| Concrete | + |
| Asbestos cement | + |
| Hard polyvinylchloride | ∅ |
| Polyacrylate | + |
| Polycarbonate | + |

+ = Good adhesion - cohesive failure (tear in elastomer).
∅ = Partial adhesion - adhesive and cohesive failure (separation between elastomer and substrate and tear in elastomer).

In another test, samples from the tubes are placed in 2±0.1 mm thick layers on a smooth surface and stored for 4 weeks at 23° C. and at 50 percent relative humidity. The tensile modulus at 100 percent elongation, the tensile strength and the elongation at break are then determined in accordance with DIN (German Industrial Standard) No. 53,504, rod S3A, and the Shore-A-Hardness of the elastomers is determined in accordance with DIN 53,505. The results of these tests prior to and subsequent to storage at elevated temperatures and humidity, are shown in Table II.

EXAMPLE 5

About 40 parts of a dimethylpolysiloxane containing an Si-bonded hydroxyl group in each of its terminal units and having a viscosity of 300,000 mPa.s at 25° C. are mixed in the following sequence with about 15 parts of a dimethylpolysiloxane having an Si-bonded hydroxyl group in each of its terminal units and having a viscosity of 20,000 mPa.s at 25° C., 35 parts of a trimethylsiloxy end-blocked dimethylpolysiloxane having a viscosity of 100 mPa.s at 25° C., 6 parts of methyltris-(methylketoxime)-silane and 2 parts of the organopolysiloxane described immediately before Example (1) which contains amino groups that are bonded to silicon via carbon. To this mixture are added first 11 parts of a pyrogenically prepared silicon dioxide having a surface area of 150 m²/g, and then 0.8 parts of the reaction product whose preparation was described in (a) above.

The resultant composition which is freed of air bubbles by evacuation, constitutes a homogeneous, smooth, soft and slump-proof mass which can be stored under anhydrous conditions and cross-links when exposed to moisture at room temperature to form an elastomer. The composition is placed in tubes and after the sealed tubes have been stored at room temperature for 24 hours, samples are removed in accordance with the procedure described in Example 4 and the elastomers formed from the samples are tested in order to determine their tensile modulus at 100 percent elongation, their tensile strength, elongation at break and Shore-A Hardness. The results are shown in Table II.

TABLE II

|  | Example 4 | | | Example 5 | | |
|---|---|---|---|---|---|---|
|  | + | ++ | +++ | + | ++ | +++ |
| Tensile Modulus at 100 percent elongation in N/mm² | 0.49 | 0.19 | 0.34 | 0.31 | 0.23 | 0.27 |
| Tensile Strength, N/mm² | 0.96 | 0.52 | 0.44 | 1.20 | 0.80 | 0.50 |
| Elongation at break percent | 460 | 395 | 350 | 510 | 600 | 340 |
| Shore-A-Hardness | 23 | 15 | 17 | 18 | 9 | 19 |

+ Properties after cross-linking and storage for 4 weeks at 50 percent relative humidity.
++ Properties after cross-linking and storage for 4 weeks at 50 percent relative humidity and an additional 2 weeks of storage at 70° C. and at 100 percent relative humidity.
+++ Properties after cross-linking and storage for 4 weeks at 50 percent relative humidity and another 8 weeks of storage at 70° C. and at 100 percent relative humidity.

COMPARISON EXAMPLE V₃

The process described in Example 4 is repeated, except that a solution containing 0.33 parts of a compound having the following formula $$Si[OSn(n-C_4H_9)_2OOCH_3]_4$$

and 0.33 parts of petroleum ether is substituted for the 0.33 parts of the reaction product whose preparation is described in (a) above.

Following the cross-linking and storage for 4 weeks at 50 percent relative humidity and following an additional 8 weeks of storage at 70° C. and 100 percent relative humidity, the elastomers are so brittle that the tensile modulus at 100 percent elongation, tensile strength, elongation at break and Shore-A-Hardness are impossible to measure.

COMPARISON EXAMPLE V₄

The procedures described in Example 5 are repeated, except that a solution containing 0.8 parts of a compound of the following formula $$Si[OSn(n-C_4H_9)_2OOCH_3]_4$$

and 0.8 parts of petroleum ether are substituted for the 0.8 parts of the reaction product whose preparation is described in (a) above.

Following cross-linking and storage for 4 weeks at 50 percent relative humidity and than an additional 8 weeks of storage at 70° C. and 100 percent relative humidity, the same results are observed as in Comparison Example V₃.

What is claimed is:

1. A composition which may be stored under anhydrous conditions, but when exposed to moisture at room temperature, cross-links to from an elastomer comprising (1) a diorganopolysiloxane having terminal condensable groups, (2) a silicon compound containing at least 3 groups per molecule selected from the class consisting of amino groups which are bonded to silicon via nitrogen, oxime groups which are bonded to silicon via oxygen, and mixtures thereof, and (3) a product which is obtained from the reaction of a diorganotin diacylate with a silicon compound selected from the group consisting of (a) a silane having as hydrolyzable groups at least two monovalent hydrocarbon radicals per molecule which are bonded to silicon via oxygen and which may be interrupted by at least one ether-oxygen, and (b) an oligomer of said silane, in which all the valences of the tin atom in the reaction product are satisfied by SnC-bonded monovalent organic radicals, or by oxygen atoms of the ≡SiOSn≡ group.

2. The composition of claim 1, wherein the organopolysiloxane (1) is represented by the formula HO(SiR₂O)$_m$SiR₂OH in which R is an SiC-bonded organic radical and m is an integer having a value of at least 10.

3. The composition of claim 1, wherein the silicon compound (2) contains at least 3 amino groups per molecule that are bonded to silicon via nitrogen.

4. The composition of claim 1, wherein the silicon compound (2) contains at least 3 oxime groups per molecule that are bonded to silicon via oxygen.

5. The composition of claim 1, wherein the silicon compound (2) contains at least 3 groups per molecule consisting of amino groups and oxime groups.

6. The composition of claim 3, wherein the silicon compound (2) is represented by the formula $R_a Si(NR_2^1)_{4-a}$ where R is an SiC-bonded organic radical, R¹ is selected from the group consisting of hydrogen and a monovalent hydrocarbon radical and a is 0 or 1.

7. The composition of claim 4, wherein the silicon compound (2) is represented by the formula $R_a Si(ON=X)_{4-a}$ where R is an SiC-bonded organic radical, X is selected from the group consisting of R₂¹C, R²C and partial hydrolyzates thereof having up to 10 carbon atoms, R¹ is selected from the group consisting of hydrogen and a monovalent hydrocarbon radical, R² is a divalent hydrocarbon radical which forms a ring with the carbon atom other than the carbon atom of R², with the proviso that at least one R¹ must be a hydrocarbon radical and a is 0 or 1.

8. The composition of claim 5, wherein the silicon compound (2) is represented by the formula $R_a Si(ON=X)_b(NR_c^1)_{4-a-b}$ where R is an SiC-bonded organ radical, X is selected from the group consisting of R₂¹C, R²C and partial hydrolyzates thereof having up to 10 carbon atoms, R¹ is selected from the group consisting of hydrogen and a monovalent hydrocarbon radical, R² is a divalent hydrocarbon radical which forms a ring with the carbon atom other than the carbon atom of R², with the proviso that at least one R¹ must be a hydrocarbon radical, a is 0 or 1, b is 0, 1, 2 or 3 and the sum of a+b may not exceed 3.9.

9. The composition of claim 1, wherein the silane containing at least two hydrolyzable groups per molecule is represented by the formula $R_c Si(OR^3)_{4-c}$ where R is an SiC-bonded organic radical, R³ is selected from the group consisting of a monovalent hydrocarbon radical and a monovalent hydrocarbon radical containing at least one ether-oxygen and c is 0, 1 or 2.

10. The composition of claim 1, wherein the oligomer of the silane contains at least two and up to 10 silicon atoms which are bonded by a siloxane-oxygen and have an average of at least one R³O group per silicon atom, R³ is selected from the group consisting of a monovalent hydrocarbon radical and a monovalent hydrocarbon radical containing at least one ether-oxygen.

11. The composition of claim 1, wherein the diorganotin diacylate is represented by the formula $R_2^4 Sn(OCOR^5)_2$ where R⁴ is an SnC-bonded organic radical, R⁵ is selected from the group consisting of a monovalent hydrocarbon radical and a substituted movalent hydrocarbon radical.

12. A process for preparing a composition which may be stored under anhydrous conditions, but when exposed to moisture at room temperature, cross-links to form an elastomer which comprises mixing (1) an organopolysiloxane having terminal condensable groups, with (2) a silicon compound containing at least 3 groups per molecule selected from the class consisting of amino groups which are bonded to silicon via nitrogen, oxime groups which are bonded to silicon via oxygen, and mixtures thereof, and (3) a product which is obtained from the reaction of a diorganotin diacylate with a silicon compound selected from the group consisting of (a) a silane having as hydrolyzable groups at least two movalent hydrocarbon radicals which are bonded to silicon via oxygen, and which may be interrupted by a least one ether-oxygen, and (b) an oligomer of said silane, in which all the valences of the tin atom in the reaction product are satisfied by SnC-bonded monovalent organic radicals or oxygen atoms of the ≡SiOSn≡ group.

13. The process of claim 12, wherein the reaction product (3) is prepared by heating for from 15 minutes to 15 hours a silicon compound selected from the group consisting of (a) a silane having as hydrolyzable groups at least two monovalent hydrocarbon radicals per molecule which are bonded to silicon via oxygen, and which may be interrupted by at least one ether-oxygen and (b) an oligomer of said silane, with a diorganotin diacylate in an amount of from 4 to 25 gram equivalents of the hydrocarbon radical which is bonded to silicon via oxygen for each mole of diorganotin diacylate at a temperature of from 15° to 200° C.

* * * * *

UNITED STATES PATENT AND TRADEMARK OFFICE
CERTIFICATE OF CORRECTION

PATENT NO. : 4,460,761
DATED : July 17, 1984
INVENTOR(S) : Dr. August Schiller, Norman Dorsch, Dr. Erhard Bosch and Dr. Oswin Sommer It is certified that error appears in the above-identified patent and that said Letters Patent are hereby corrected as shown below:

Page 1, column 1, under "Inventors", line 2, after "Dorsch", insert "Erhard Bosch and Oswin Sommer,".

Same line, thus changing the word "both" to "all".

Signed and Sealed this

Fifteenth Day of January 1985

[SEAL]

Attest:

Attesting Officer

GERALD J. MOSSINGHOFF

Commissioner of Patents and Trademarks